United States Patent [19]
Kaneo et al.

[11] Patent Number: 5,218,593
[45] Date of Patent: Jun. 8, 1993

[54] DISK LOADING APPARATUS

[75] Inventors: Toshihiro Kaneo, Osaka; Yoshitsugu Morimoto, Neyagawa; Shinya Sugahara, Kofu; Soichi Kimura, Katano, all of Japan

[73] Assignee: Matsushita Electric Industrial Co. Ltd., Osaka, Japan

[21] Appl. No.: 759,910

[22] Filed: Sep. 13, 1991

[30] Foreign Application Priority Data

Sep. 26, 1990 [JP] Japan .................. 2-258060

[51] Int. Cl.[5] .......................................... G11B 33/02
[52] U.S. Cl. .................... 369/77.1; 369/75.2; 360/99.06; 360/99.02
[58] Field of Search ............ 369/77.1, 79, 75.2, 369/75.1, 191, 215, 218; 360/99.06, 99.07, 99.09, 99.02, 99.03, 98.06, 98.07

[56] References Cited

U.S. PATENT DOCUMENTS 4,890,276 12/1989 Ono et al. .................... 369/77.2
5,063,553 11/1991 Suzuki et al. ................ 369/75.2

FOREIGN PATENT DOCUMENTS 0143442 6/1985 European Pat. Off. .
0416797 3/1991 European Pat. Off. .

Primary Examiner—Paul M. Dzierzynski
Assistant Examiner—Don Wong
Attorney, Agent, or Firm—Stevens, Davis, Miller & Mosher

[57] ABSTRACT

The rotary motion of a driving cam driven by a driving motor is converted into both the upward and downward movement of a deck member and the forward and backward movement of a tray, so that the deck member and the tray can be driven by a single motor. Further, the conversion into the upward and downward movement of the deck member and the forward and backward movement of the tray is performed by the engagement of a pin of the driving cam with a straight groove and a circular groove of a driving lever. Since the straight groove is extended in the tangential direction of the driving cam, when the pin engages with the straight groove, the driving lever receive a force to slow down the opening and closing speed of the tray at the beginning and end of the movement, thereby improving the quality of the loading operation.

4 Claims, 5 Drawing Sheets

DISK LOADING APPARATUS

FIELD OF THE INVENTION

This invention relates to a disk loading apparatus for use in an optical disk player, such as a CD player, to bring a disk to a playing position of the disk player for playing the same.

BACKGROUND OF THE INVENTION

A conventional disk loading apparatus will be described with reference to the accompaying drawings.

FIG. 1 is a plan view of a mechanism for opening and closing a tray of the conventional disk loading apparatus. Reference numeral 9 denotes a tray driving motor and 5 denotes a tray. A rack 5b of the tray 5 is in mesh with a pinion 9a of the tray driving motor 9. Reference numerals 5c and 5d denote protrusions formed on the side surface of the tray 5 for serving to operate a tray position detector switch 10.

FIG. 2 is a side view of a mechanism for moving up and down a deck member 7. Reference numeral 6 denotes a base. Grooves 6a formed on both sides of the base 6 serve as a guide of movement of the tray 5 by slidably supporting projections 5g of the tray 5. On the other hand, a pin 7a provided on the deck member 7 for reading signals from a compact disk (referred to as CD, hereinafter) is put in a groove 6b so that the deck member 7 pivots about the pin 7a. Reference numeral 5e denotes a concave portion on which the CD is to be placed, and 5h denotes a hole for serving to prevent a turntable 7c from interfering with the tray 5 when the deck member 7 is moved upwards. Reference numeral 11 denotes a lifting motor the driving force of which is transmitted through a belt 2 to a lifting cam 12. The lifting cam 12 is formed in its side face with an inclined groove 12a with which a pin 7b provided on the deck member 7 is brought into engagement. Reference numeral 13 denotes a lift detector switch which serves to detect whether or not the deck member 7 has been raised to a predetermined position.

With the above construction, when it is intended to load and play a CD, by putting the CD on the concave portion 5e of the tray in the first place and then driving the motor 9, the tray 5 is made to move in the direction of an arrow a shown in FIG. 1. Therefore, the protrusion 5d operates the position detector switch 10 to thereby stop the motor 9. Subsequently, the motor 11 is driven to rotate the lifting cam 12 so that the pin 7b is caused to run up the inclined groove 12a and, hence, the deck member 7 is caused to pivot in the direction of an arrow g shown in FIG. 2. When the turntable 7c of the deck member 7 is positioned in the hole 5h and the CD is lifted from the tray concave portion 5e until the upper end portion of the deck member 7 comes into contact with the detector switch 13, the detector switch 13 operates to stop the motor 11 and then the turntable 7c is rotated to play the disk.

When it is intended to take out the CD which has been finished playing, the motor lifting cam 12 is rotated in the direction reverse to the direction in which the cam 12 is rotated at the time of starting to paly the CD, so that the deck member 7 is caused to pivotted in the direction of an arrow h shown in FIG. 2. The motor 9 is also rotated in the direction reverse to the direction in which the motor 9 is rotated at the time of starting to play so as to make the tray 5 move in the direction of an arrow b shown in FIG. 1, thereby permitting to take out the CD.

However, with such conventional construction, it is necessary to use two motors since the movement of the tray and the upward and downward movement of the deck member depend on the independent separate driving systems, resulting in the problems of cost and reduction of size of the mechanism. Further, since it is necessary in connecting the respective movements to adjust timing delicately in consideration of the scatter in mechanical loads, in order to reduce the speed of the tray as low as possible at each end of the opening and closing operation of the tray so as to improve the quality of the movement, it is also necessary to take measures in respect of the electric circuit so as to keep the rotational frequency of the motor under complicated servocontrol.

SUMMARY OF THE INVENTION

The present invention aims at solving the above problems, and an object thereof is to provide a disk loading apparatus which is capable of performing the movement of a tray and the upward and downward movement of a deck member at good timing with accuracy so as to assure the loading operation of high quality.

To this end, there is provided according to the present invention a disk loading apparatus which comprises a driving motor, a driving cam rotatably connected with said driving motor through a transmission member and having an engaging portion, a driving lever formed therein with a groove for engagement with said engaging portion of said driving cam and associated with a movement of said driving cam about a center of rotation thereof which is offset from a center of rotation of said driving cam, a tray associated with the movement of said driving lever and moveable back an forth with a disk carried thereon, and a deck member associated with the movement of said driving cam and moveable up and down and reading signals from said disk, and in which said groove comprises a first groove segment extended in the tangential direction of said driving cam and of a second groove segment formed continuously to said first groove segment so as to extend in the direction of rotation of said driving cam.

In accordance with such construction, the rotary motion of the driving cam driven by the driving motor is converted into both the upward and downward movement of the deck member and the forward and backward movement of the tray, and furthermore, the conversion into the upward and downward movement and the forward and backward movement is performed by the engagement of the pin of the driving cam with the first and second groove segments of the driving lever. By the engagement of the pin with the first groove segment, the opening and closing speed of the tray can be slowed down at the end of the opening and closing movement of the tray, thereby making it possible to improve the quality of the loading operation only by the simple mechanical construction.

DESCRIPTION OF THE PREFERRED EMBODIMENT

Description will be given below of a disk loading apparatus according to an embodiment of the present invention.

Figure 1:
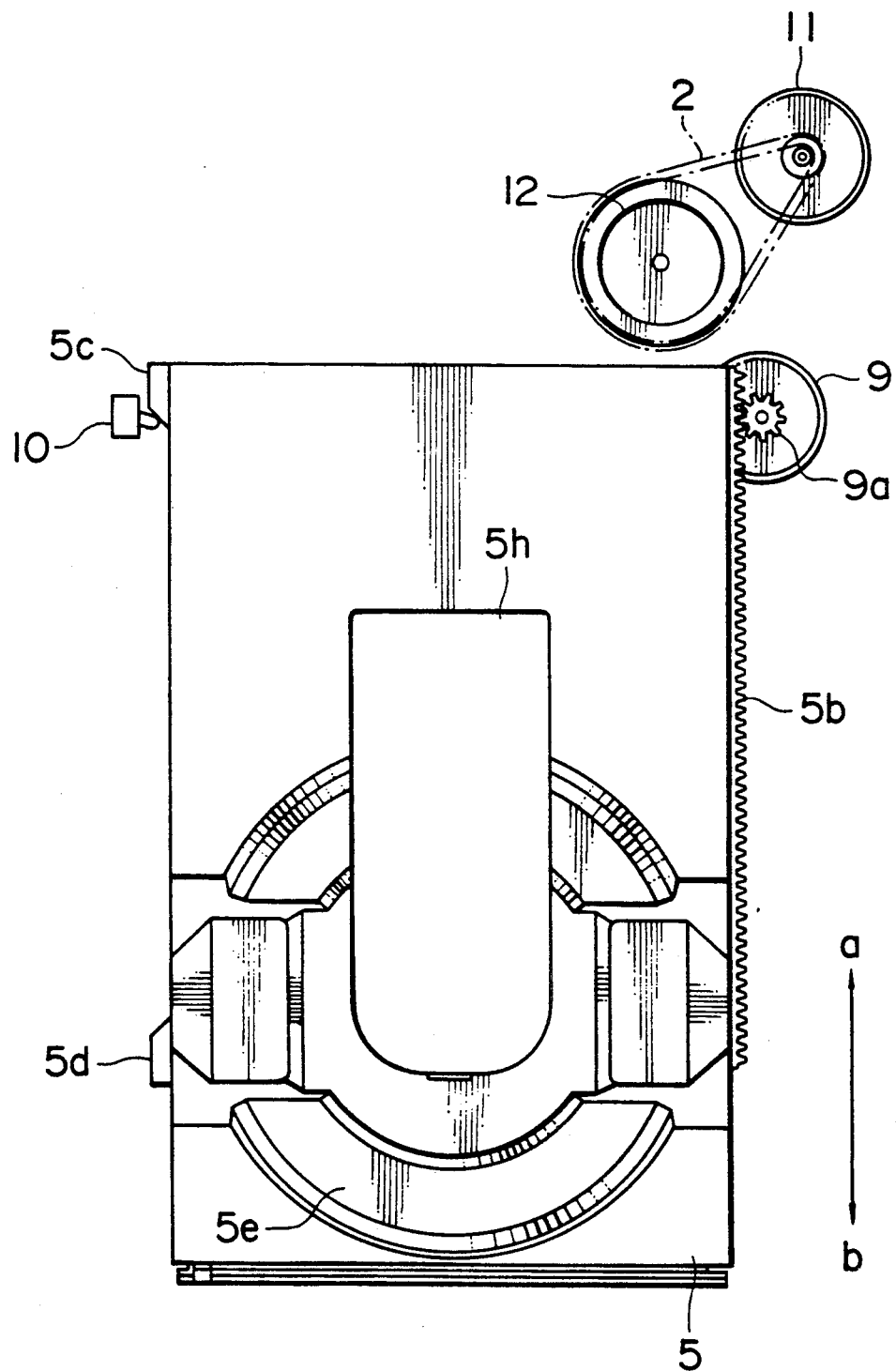
FIG. 1 is a plan view of a conventional disk loading apparatus.
Figure 2:
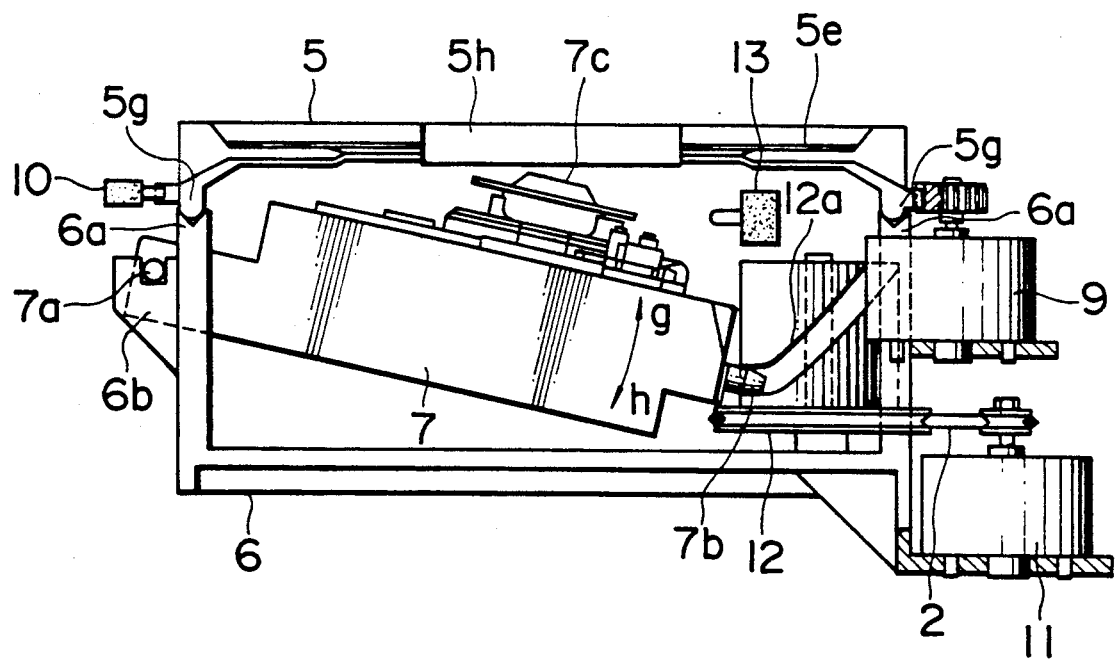
FIG. 2 is a side view of the conventional disk loading apparatus.
Figure 3:
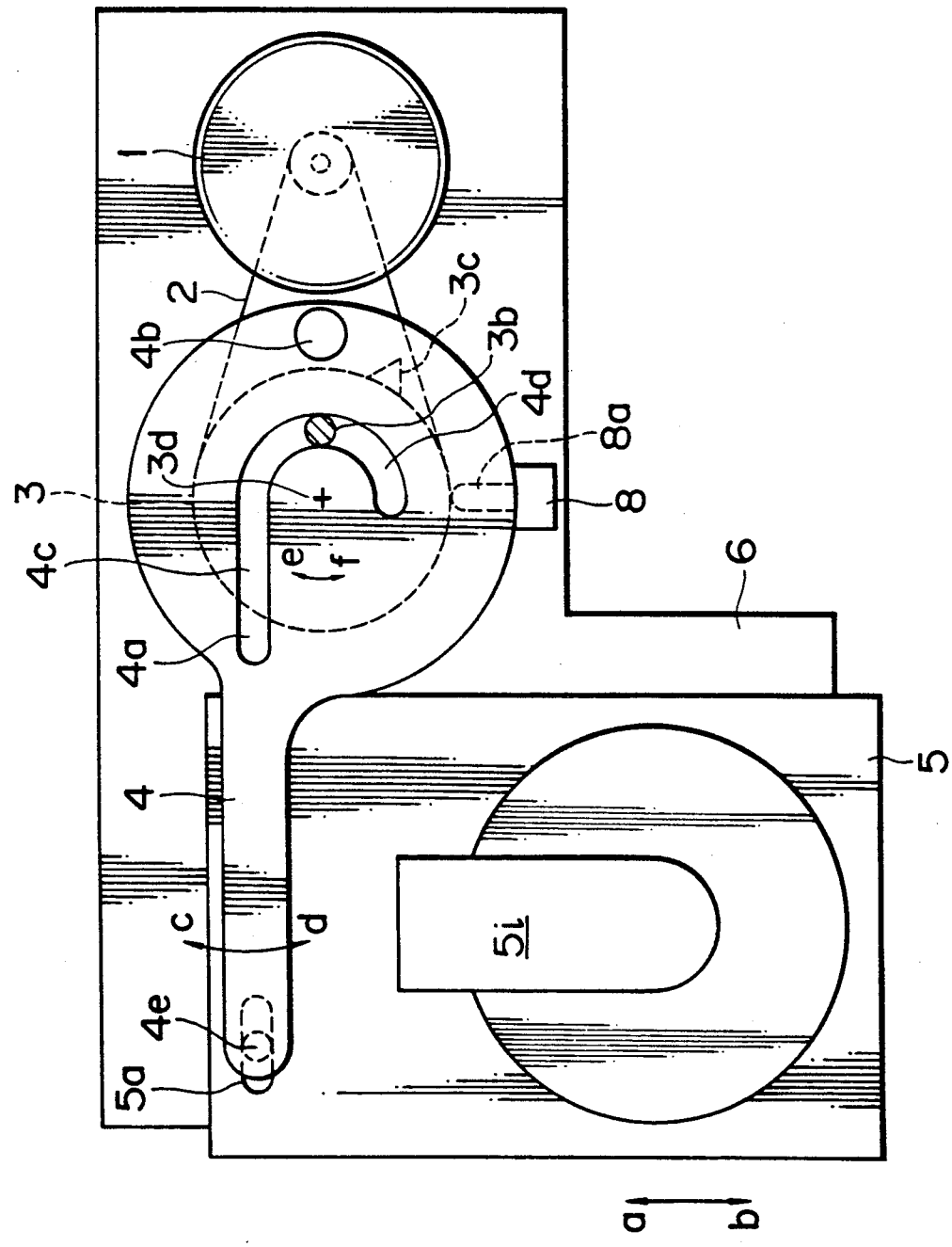
FIG. 3 is a plan view of a disk loading apparatus according to an embodiment of the present invention.
Figure 4A:
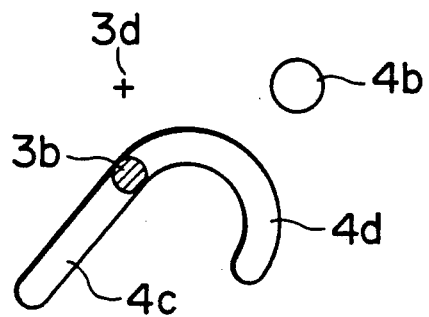
FIGS. 4A, 4B and 4C are plan views showing the operating states of a driving lever of the disk loading apparatus.
Figure 4B:
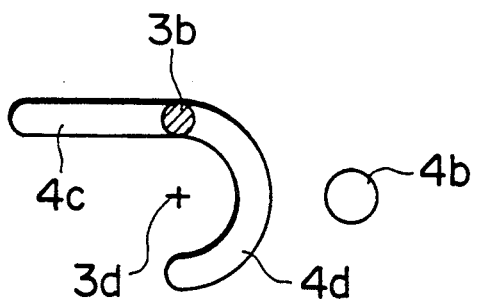
Figure 4C:
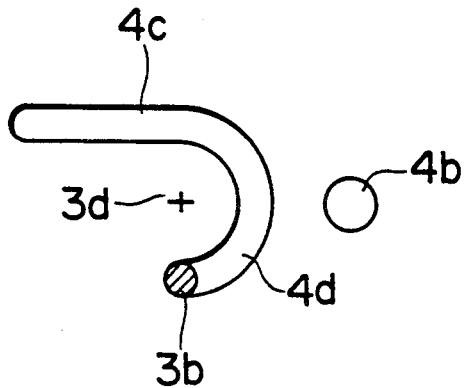
Figure 5:
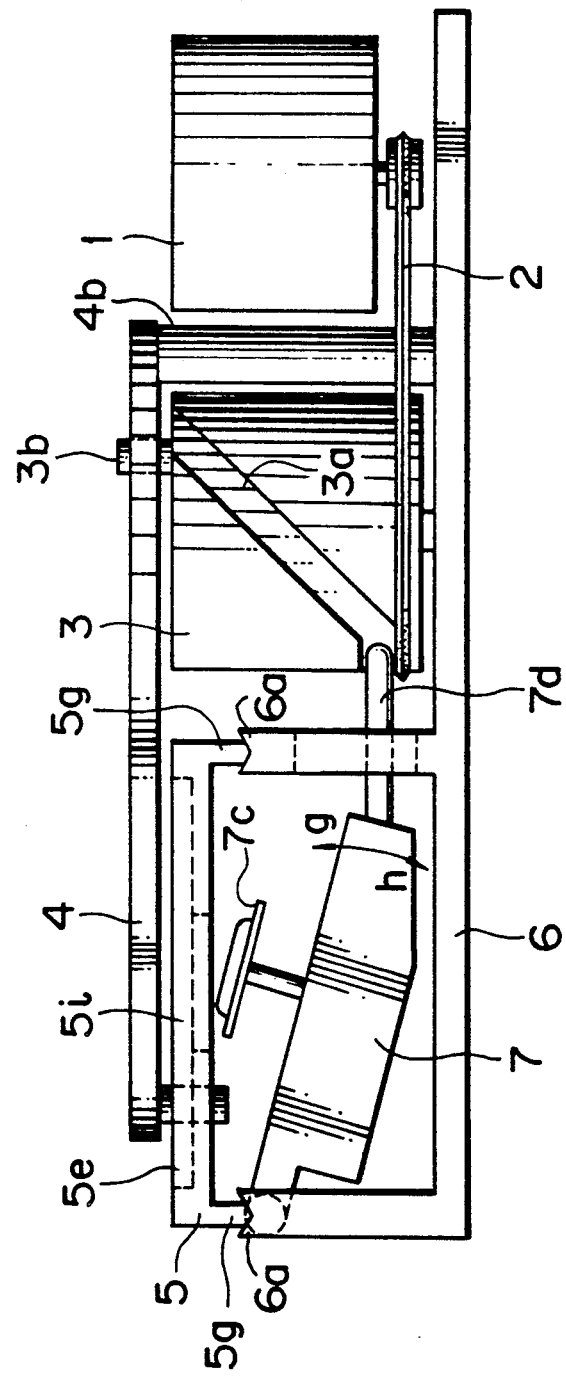
FIG. 5 is a side view of the disk loading apparatus.

FIG. 3 is a plan view of a tray opening and closing mechanism of the disk loading apparatus of the invention, FIG. 4 illustrate the principle of the movement of a driving lever of the apparatus, and FIG. 5 is a side view of a deck member lifting mechanism of the disk loading apparatus of the invention.

Reference numeral 1 denotes a driving motor, 2 denotes a belt serving to transmit the turning force from the driving motor 1, and 3 denotes a driving cam to which the turning force from the driving motor 1 is transmitted through the belt 2. The driving cam 3 has an inclined groove 3a, a pin 3b and a projection 3c formed respectively in its side surface, on its top surface and on its upper side surface. Reference numeral 4 denotes a driving lever having an axis of rotation 4b located in a position different from a position of a center of rotation 3d of the driving cam 3. the driving lever 4 is formed with a J-shaped groove 4a in the position facing to the top surface of the driving cam 3 so that the pin 3b of the driving cam 3 is made to slidably engage with the J-shaped groove 4a. The J-shaped groove 4a consists of a straight groove 4c extended in the tangential direction of the driving cam 3 and of a circular groove 4d formed continuouly to the straight groove 4c so as to extend in the direction of rotation of the driving cam 3. A pin 4e is provided at one end of the driving lever 4. Reference numeral 5 denotes a tray which reciprocates with a disk carried thereon. The tray 5 is formed at one end thereof with a slot 5a for slidable engagement with the pin 4e of the driving lever 4, and a hole 5i is formed in a part of the tray 5.

Reference numeral 6 denotes a base. Grooves 6a formed on both sides of the base 6 serve as a guide of movement of the tray 5 by slidably supporting projections 5g of the tray 5. Reference numeral 7 denotes a deck member one end of which is rotatably pivotted by an end portion of the base 6 and the other end of which is formed with an engaging piece 7d for engagement with the inclined groove 3a of the driving cam 3. A turntable 7c is formed in an upper part of the deck member 7 so as to be positioned in the hole 5i of the tray 5 when the deck member 7 is moved upwards. Reference numeral 8 denotes a position detector switch provided on the base 6. The position detector switch 8 has a switch piece 8a which serves to come into contact with the projection 3c of the driving cam 3 when the driving cam 3 is rotated to a predetermined position.

Operation of the disk loading apparatus according to an embodiment of the present invention which has the above-described construction will be described below.

First, as the motor 1 is rotated counterclockwise for moving the tray 5 in the direction of an arrow b of FIG. 3 in order to bring the tray 5 into its full opened state, the driving cam 3 is rotated in the direction of an arrow f through the driving belt 2 and the pin 3b is also rotated in the same direction as the driving cam 3. Therefore, the state of engagement between the pin 3b and the J-shaped groove 4a of the driving lever 4 is changed from a state of FIG. 4(B) to a state of FIG. 4(A). In this case, the pin 3b is rotated about the axis of rotation 3d of the driving cam 3. However, since the radial center of the circular groove 4d and the center of rotation of the driving cam 3 are made to offset, the movement of the pin 3b in the direction of rotation of the driving cam 3 is regulated by the straight groove 4c of the J-shaped groove 4a, so that the driving lever 4 receives a force. In consequence, when the tray 5 is moved in the direction of an arrow b of FIG. 3 due to engagement between the pin 4e and the slot 5a, the speed at which the tray 5 is opened is slowed down continuously until the tray 5 is brought to its opened state (see FIG. 4(A)).

Subsequently, as the motor 1 is rotated clockwise with the tray 5 carried the CD thereon, the driving cam 3 is rotated clockwise. However, since the radial center of the circular groove 4d and the center of rotation of the driving cam 3 are being offset, the movement of the pin 3b in the direction of the driving cam 3 is regulated by the straight groove 4c of the J-shaped groove 4a, so that the driving lever 4 receives a force. In consequence, when the tray 5 is moved in the direction of an arrow a of FIG. 3 due to engagement between the pin 4e and the slot 5a, the speed at which the tray 5 is closed is slowed down continuously until the tray 5 is brought into its closed state (see FIG. 4(B)). Further rotation of the driving cam 3 from the state of FIG. 4(B) causes the pin 3b rotate clockwise along the circular groove 4d of the J-shaped groove 4a. When the radial center of the circular groove 4d and the center of rotation 3d of the driving cam 3 coincide with each other, the driving lever 4 does not receive a force. Rotation of the pin 3b along the circular groove 4d causes the deck member 7 move upwards in the direction of an arrow g of FIG. 5 due to engagement between the inclined groove 3a of the driving cam 3 and the engaging piece 7d of the deck number 7. When the pin 3b arrives at the forward end of the circular groove 4d as shown in FIG. 4(C), the projection 3c of the driving cam 3 comes into contact with the switch piece 8a of the position detector switch 8, so that the rotation of the driving cam 3 is stopped. In this state, the deck member 7 is fully lifted and the turntable 7c is positioned in the hole 5i of the tray 5 with the CD holded thereon, thus completing the loading operation.

Next, when it is intended to take out the CD, counterclockwise rotation of the motor 1 causes the driving cam 3 rotate in the same direction, so that the pin 3b is rotated from the position of FIG. 4(C) to the position of FIG. 4(B). During this rotation, since the radial center of the circular groove 4d and the center of rotation 3d of the driving cam 3 coincide with each other as described above, only the deck member 7 is moved downwards in the direction of an arrow h of FIG. 5 without applying any force to the driving lever 4. As the pin 3b is further rotated from the position of FIG. 4(B), the pin 3b engates with the straight groove 4c, so that the radial center of the circular groove 4d and the center of rotation of the driving cam 3 are made to offset, resulting in that the driving lever 4 receives a force from the pin 3b. In consequence, the tray 5 is moved in the direction of an arrow b of FIG. 3 with the speed being slowed down at the beginning and end of the movement thereof until it is brought to its opened state. Thereafter, the CD is permitted to be taken out from the tray 5.

As described hereinabove, according to the disk loading apparatus of this embodiment, since the pin 3b of the driving cam 3 and the J-shaped groove 4a are engaged with each other, it is possible to drive both the deck member 7 and the tray 5 by the driving motor 1 alone. In particular, it is designed to divide the rotary motion of the driving cam 3 into the forward and backward movement of the tray 5 and the upward and downward movement of the deck member 7. That is to say, when the pin 3b of the driving cam 3 engages with the straight groove 4c of the J-shaped groove 4z, the tray 5 only is moved and when the pin 3b engages with the circular groove 4d, the deck member 7 only is moved. Further, when the pin 3b engages with the straight groove 4c, and therefore, the driving lever 4 receives a force, so that the speed of the opening and closing movement of the tray 5 is slowed down at the beginning and end thereof, thereby improving the quality of the loading operation.

What is claimed is:

1. A disk loading apparatus comprising:
    a driving motor;
    a driving cam rotatably connected with said driving motor through a transmission member and having an engaging portion;
    a driving lever formed therein with a groove for engagement with said engaging portion of said driving cam and associated with a movement of said driving cam about a center of rotation thereof which is offset from a center of rotation of said driving cam;
    a tray associated with the movement of said driving lever and moveable back and forth with a disk carried thereon; and
    a deck member associated with the movement of said driving cam and moveable up and down and reading signals from said disk,
    wherein said groove comprises a first groove segment extended in the tangential direction of said driving cam and of a second groove segment formed continuously to said first groove segment so as to extend in the direction of rotation of said driving cam.

2. A disk loading apparatus according to claim 1, wherein said driving cam has an inclined groove in a side surface thereof and said deck member has a pin for engagement with said inclined groove.

3. A disk loading apparatus according to claim 1, further comprising a switch which serves to detect completion of the upward movement of said deck member so as to stop the driving cam.

4. A disk loading apparatus according to claim 2 further comprising a switch which serves to detect completion of the upward movement of said deck member so as to stop the driving cam.

* * * * *